United States Patent

[11] 3,576,101

| [72] | Inventor | Earl Oliver Setterblade<br>Shelton, Conn. |
|---|---|---|
| [21] | Appl. No. | 845,948 |
| [22] | Filed | July 30, 1969 |
| [45] | Patented | Apr. 27, 1971 |
| [73] | Assignee | Avco Corporation<br>Cincinnati, Ohio |

[54] COMBINED DIESEL AND GAS TURBINE POWER UNIT
1 Claim, 4 Drawing Figs.

[52] U.S. Cl. .................................................... 60/11,
60/39.31, 60/39.5, 60/39.52
[51] Int. Cl. ................................................... F01k 23/14,
F02c 7/10
[50] Field of Search ........................................... 60/266,
264, 39.5, 39.52, 39.3

[56] References Cited
UNITED STATES PATENTS

| 2,306,953 | 12/1942 | Jung .............................. | 60/11X |
| 2,508,288 | 5/1950 | Owner et al. .................. | 60/266X |
| 2,604,277 | 7/1952 | Anxionnaz et al. ........... | 60/266X |
| 3,095,694 | 7/1963 | Walter .......................... | 60/264X |
| 3,217,490 | 11/1965 | Chilvers ........................ | 60/39.31 |
| 3,388,684 | 6/1968 | Gros et al. .................... | 60/11X |

*Primary Examiner*—Mark M. Newman
*Attorney*—Darby and Darby

ABSTRACT: A vertically mounted turbine engine includes air inlet means surrounding, at least in part, an upwardly extending exhaust duct to cause substantial heat transfer between the hot exhaust gases and the relatively cool inlet air. The vertical mounting of the turbine engine provides a substantial reduction in the space required for support of the engine.

PATENTED APR 27 1971

INVENTOR
EARL OLIVER SETTERBLADE

BY Darby & Darby

ATTORNEYS

PATENTED APR 27 1971 3,576,101

INVENTOR
EARL OLIVER SETTERBLADE

BY *Darby & Darby*

ATTORNEYS

COMBINED DIESEL AND GAS TURBINE POWER UNIT

The present invention relates to gas turbine engines, and more particularly, to an arrangement of the air inlet and exhaust means for such engines which provides a substantial reduction in the temperature of the exhaust gases.

A gas turbine engine is capable of providing tremendous power relative to its size. However, these engines also produce extremely hot exhaust gases, the temperature of which may be in the order of 1000° F. It is desirable for obvious reasons of safety, convenience, etc. to reduce the temperature of these exhaust gases. For military purposes, perhaps of even greater concern is the attendant high temperature of the metallic parts of the engine which radiate substantial amounts of infrared energy, rendering the engine susceptible to detection by infrared-sensitive devices. The present invention relates to a simple and relatively inexpensive means for providing a heat transfer path between the hot exhaust gases and the relatively cool inlet air on which the turbine operates.

A subsidiary but important advantage of the invention is due to the increase in temperature of the inlet air. Thus, induction of atmospheric air can result in precipitation of water vapor in the inlet and first compressor stages. Where the air contains a substantial amount of salt-laden moisture, this can create a severe problem with respect to corrosion of the compressor blades. However, if the inlet air is heated, the moisture will remain in a vapor state during compression, thus reducing corrosion of the compressor blades. Heating of the inlet air may also permit elimination of relatively costly deicing system as currently used.

Although not definitely established at this time, it is further possible that the invention may produce improved thermal efficiency. This may occur simply by virtue of the recovery of some of the latent exhaust heat, particularly if the compressor blades are redesigned to operate at higher temperatures. This increase in efficiency may be sufficient to more than offset the inherent reduction in efficiency where a Brayton cycle engine is operating on preheated air.

Briefly, according to the present invention, the inlet means, which serves as a passageway for the relatively cool air fed to the compressor of the turbine, is arranged in relationship to the turbine exhaust to provide a heat transfer path between the relatively cool inlet air and the hot exhaust gases of the turbine. As a result, the temperature of the exhaust gases is reduced and the temperature of the inlet air is increased. In addition to achieving the benefits enumerated above, in the preferred embodiment where the inlet air passageway envelops the exhaust, the invention is also effective to suppress noise.

Further, in accordance with the preferred embodiment, the gas turbine engine is mounted with its longitudinal axis vertical. This particular arrangement provides an additional benefit by reducing the support area and engine room space required for physical support of the engine, an advantageous feature where space is at a premium, as in boat installations.

The invention is described in detail below with reference to the attached drawings, wherein.

Figure 1:
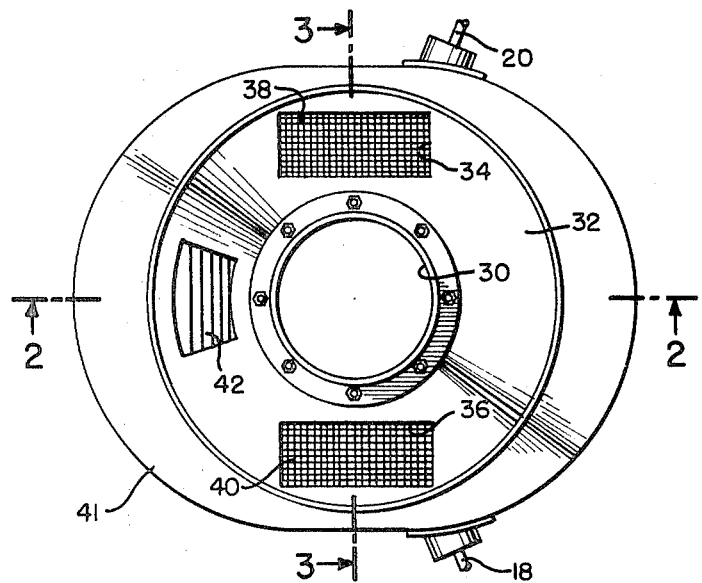
FIG. 1 is a top plan view of a vertically mounted gas turbine engine according to a preferred embodiment of the invention.

In the drawings, and in the following description, the operating portions of the gas turbine engine are shown diagrammatically inasmuch as the preferred embodiment of the invention employs a standard turbine engine (except as modified pursuant to the invention). Similarly, the operation of the turbine, which is also well known, is only described where helpful in understanding and/or appreciating the invention. Obviously, the invention is not limited in any respects to a specific turbine engine. For purposes of example only, a turbine engine which can be used pursuant to the invention is the TF-20 Brayton cycle turbine manufactured by the Lycoming Division of Avco Corporation.

In the following description and claims, reference to the longitudinal axis of a gas turbine engine is intended to refer to the axis about which the turbine blades rotate. The terms "horizontal" and "vertical" are used with respect to Earth although, as will become apparent, the invention is not dependent upon precise or critical relationships and, for many purposes, the benefits of the invention can be achieved even where the respective parts are not in the precise relationship stated.

Figure 2:
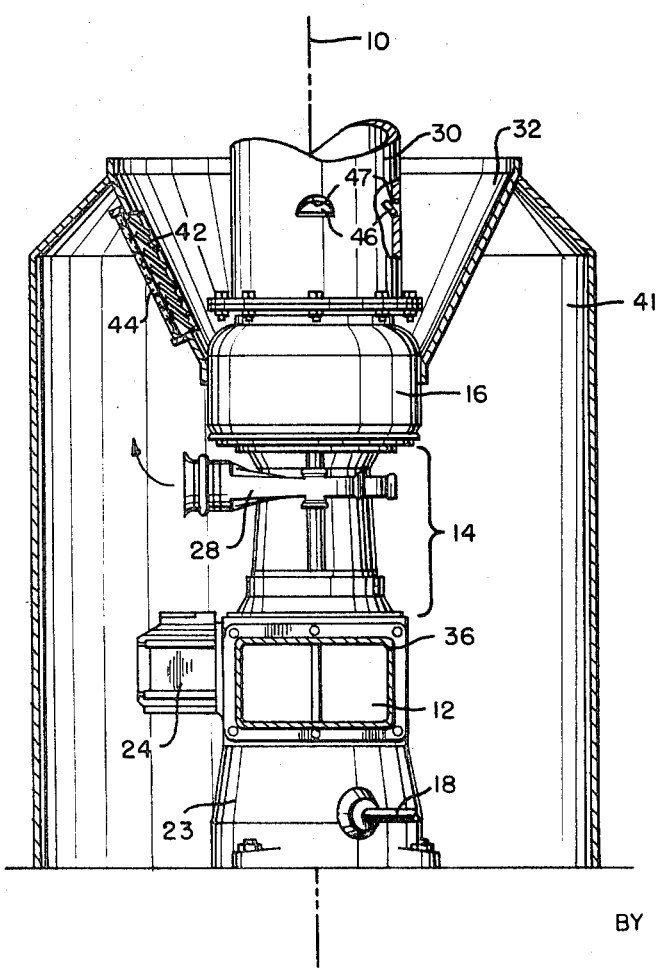
FIG. 2 is a side sectional view along the line 2-2 of FIG. 1.
Figure 3:
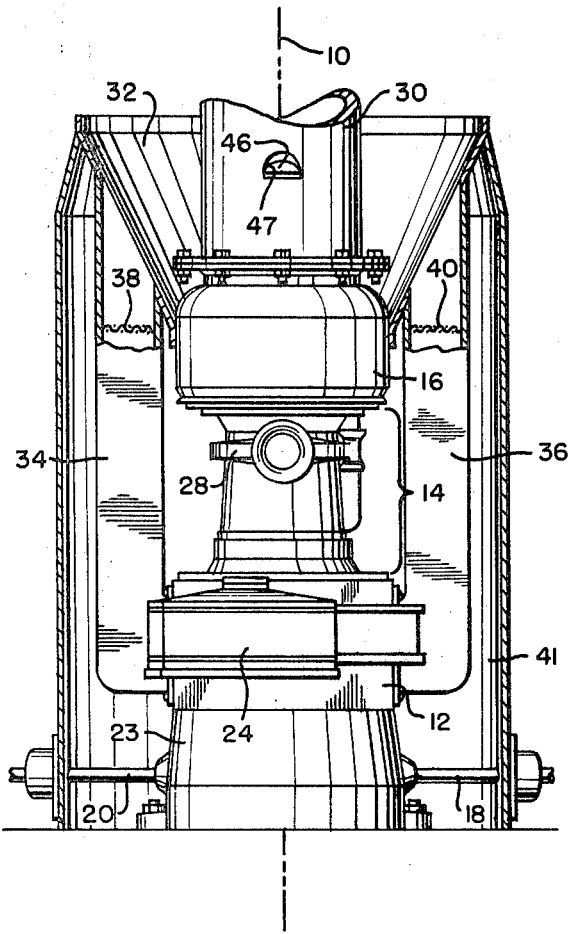
FIG. 3 is a front sectional view along the line 3-3 of FIG. 1.

Referring to FIGS. 1, 2 and 3, a gas turbine engine is illustrated with its longitudinal axis shown at 10. The turbine includes an air inlet portion 12, a compressor section 14, and a combustion chamber 16. Within the combustion chamber 16 there are two sets of rotary turbine blades (not illustrated) which rotate about longitudinal axis 10. One set of blades provides the driving force for the compressor 14 and the other provides the prime driving power for a pair of output shafts 18 and 20 (diagrammatically illustrated) which extend in a horizontal plane from a base 23 on which the turbine is mounted. The output shafts 18 and 20 may be driven by suitable reduction gears (not illustrated) within base 23, which also serves as a reservoir for the engine lubricant.

An accessory gear box 24, mounted adjacent the inlet portion 12, is powered through suitable gears (not shown) by one of the two sets of turbine blades and serves as a driving means for conventional turbine accessories such as a generator or fuel governor (not illustrated) which may be attached to the gear box 24 as desired. An annular tube 28 envelops the periphery of compressor 14 near its upper portion to bypass air from the compressor through a relief valve within the turbine which operates to relieve compressor stall during periods of rapid acceleration. The exhaust duct for the turbine, shown at 30, extends upwardly from combustion chamber 16 with its longitudinal axis colinear with the axis of the engine. For purposes of this invention, exhaust duct 30 should be made of a good thermally conductive material.

The operation of the gas turbine engine as so far described is known. Air entering the inlet portion 12 is compressed by the compressor stage 14 and fed under compression to the combustion chamber 16 into which fuel is injected by conventional means (not illustrated) causing continuous combustion within combustion chamber 16. The resultant hot gases are expelled with great force against the turbine blades disposed concentrically within the combustion chamber 16, causing the blades to rotate about axis 10 to drive the output shafts 18 and 20, the accessory gear box 24, and the compressor stage 14. The hot gases in chamber 16 are expelled through the exhaust duct 30 after passing through both sets of turbine blades.

According to the preferred embodiment of the invention, the inlet air means (which feeds the inlet portion 12) includes a conically shaped funnel 32 enveloping the entire periphery of the thermally conductive exhaust duct 30, and a pair of inlet air ducts 34 and 36 which conduct air from the funnel 32 to oppositely disposed air inlet openings within inlet portion 12. Since the passageway for the inlet air is defined by the space between funnel 32 and the outer periphery of exhaust duct 30, the exhaust and air inlet passageways are contiguous, providing a thermally conductive path between the relatively cool inlet air and the hot exhaust gases. The resultant transfer of heat during operation of the turbine engine reduces the temperature of the exhaust gases (and the exhaust duct 30) and increases the temperature of the inlet air.

Suitable screens 38 and 40 may be provided in the inlet ducts 34 and 36, respectively, to block the passage of foreign matter through the turbine engine. The entire engine construction may be enclosed within a generally cylindrical housing 41 with a flap valve 42 and filter 44 (FIG. 2) being provided within funnel 32 to enable the bypass air from tube 28 to be expelled directly into the inlet stream of air.

As a further feature of the invention, a number of damper valves 46 may be provided within suitable openings 47 in exhaust duct 30 to provide direct fluid transfer channels between the inlet passageway and exhaust duct 30. During operation the high velocity exhaust gases will aspirate inlet air directly into the exhaust stream through the open valves 46 due to the Venturi effect thereby further reducing the temperature of the exhaust gases by direct mixing with the inlet air.

Figure 4:
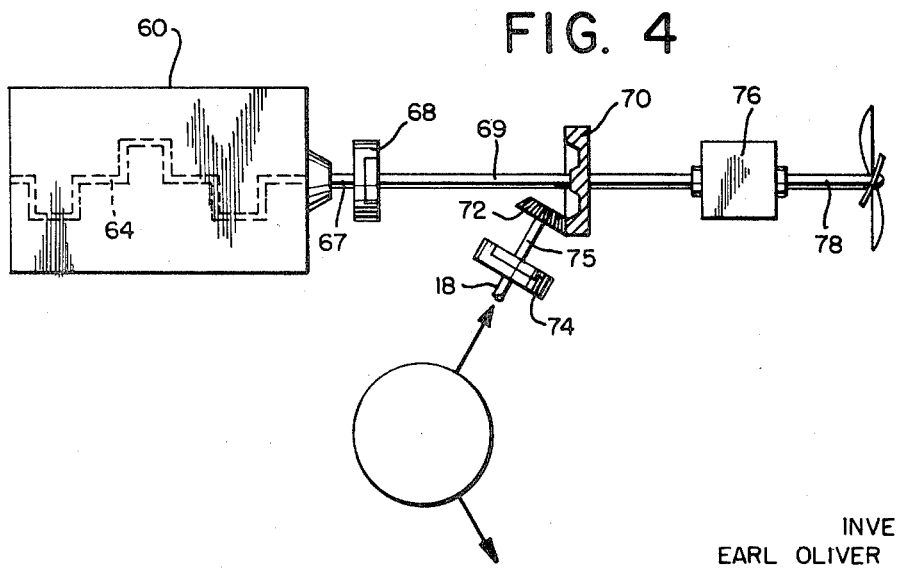
FIG. 4 is a diagrammatic illustration of a preferred installation wherein the turbine engine of FIGS. 1, 2 and 3 is intended to be used as an alternative source of power with conventional diesel engines.

The arrangement of the gas turbine engine as illustrated in FIGS. 1, 2 and 3 is of particular utility with respect to certain shipboard installations. Thus, it is known to use the combination of a gas turbine engine and one or more diesel engines as alternative power sources for boat propellers. On almost any boat, space is at a premium, and the prior art horizontal mounting arrangements for both diesel and gas turbines is not always feasible. Pursuant to the present invention, where the turbine is mounted with its longitudinal axis vertical, and using commercially available gas turbine engines, a substantial saving in engine room space (in the order of 250 cubic feet) can be obtained in a normal engine room between 6 and 7 feet in height. FIG. 4 illustrates diagrammatically a preferred mounting arrangement for a vertical gas turbine engine in combination with two diesel engines.

The diesel engines are identical, only a single diesel 60 being illustrated. Each includes a crankshaft 64 having its axis of rotation in a horizontal plane. The output shaft 67 of crankshaft 64 is coupled through a one-way clutch 68 (such as a Sprag clutch) to the driving shaft 69 of a first bevel gear 70. The bevel gear 70 is driven by the associated turbine output shaft 18 through a mating bevel gear 72 connected by a shaft 75 to a second one-way clutch 74. The output gear 70 is coupled through a standard reversing gear 76 to the propeller shaft 78 of the boat. As known, the one-way clutches 68 and 74 couple their respective input and output shafts together only when the input shaft is rotating in one direction relative to the output shaft.

When the speed of rotation of turbine output shaft 18 exceeds the speed of rotation of the shaft 75 which drives gear 72, the gas turbine will be connected through clutch 74 to the propeller shaft 78. Similarly, when the speed of rotation of the diesel output shaft 67 exceeds the speed of rotation of the shaft 69 the diesel 60 operates through clutch 68 to drive propeller shaft 78.

When the turbine drive is operable, the diesel will be unloaded and therefore tend to overspeed. Conventional means may be used to sense this condition and either shut down the diesel or cause it to idle. When the diesel drive is operable, the speed of rotation of the turbine output shaft 18 must be reduced to a value less than the power transfer speed of rotation, i.e. that speed at which the clutch 74 couples its input shaft 18 to the output shaft 75. This may require that the turbine be shut down or idled.

Although the invention has been illustrated and described with respect to a preferred embodiment, it is obviously not so limited and numerous modifications will be obvious to those skilled in the art. For example, among other things, the exact configuration of the air inlet means is not critical so long as heat transfer between the exhaust gases and inlet air is achieved. It is even possible for the advantages of the invention to be realized where the air inlet means does not completely envelop the exhaust duct. Accordingly, the invention should be defined with respect to the following claims.

I claim:

1. A power unit comprising:
   at least one diesel engine mounted with the axis of rotation of its crankshaft in a horizontal plane;
   a gas turbine engine having a rotor assembly with a vertically positioned axis of rotation and a downwardly extending output shaft, said gas turbine engine having an inlet adjacent its output shaft and a generally upwardly directed outlet for hot gases from the opposite end of said engine;
   a generally vertically directed inlet duct connected to said gas turbine inlet for supplying a source of intake air to said gas turbine;
   an exhaust duct extending from said engine outlet and through said inlet duct so that a heat transfer between the intake air and the relatively hot outlet gas is accomplished for minimizing infrared radiation of said exhaust duct;
   fluid transfer means in said exhaust duct for permitting intake air from said inlet duct to mix with said relatively hot gases in said exhaust duct, thereby further minimizing infrared radiation; and
   a combining gear means for selectively coupling the diesel engine and said gas turbine engine to a driven member.